United States Patent
Madsen

(10) Patent No.: US 10,290,129 B2
(45) Date of Patent: May 14, 2019

(54) METHOD AND SYSTEM FOR VISUALIZING NETWORKS

(71) Applicant: Arista Networks, Inc., Santa Clara, CA (US)

(72) Inventor: Ryan Sherali Madsen, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 317 days.

(21) Appl. No.: 15/182,314

(22) Filed: Jun. 14, 2016

(65) Prior Publication Data

US 2017/0358111 A1    Dec. 14, 2017

(51) Int. Cl.
*G06T 11/20* (2006.01)
*H04L 12/24* (2006.01)
*H04L 29/08* (2006.01)

(52) U.S. Cl.
CPC ........ *G06T 11/206* (2013.01); *H04L 41/0893* (2013.01); *H04L 41/12* (2013.01); *H04L 41/22* (2013.01); *H04L 67/36* (2013.01); *H04L 69/324* (2013.01); *Y02D 30/30* (2018.01)

(58) Field of Classification Search
CPC ...................................................... G06T 11/20
See application file for complete search history.

(56) References Cited

U.S. PATENT DOCUMENTS

| | | |
|---|---|---|
| 6,952,208 B1 | 10/2005 | Arquie et al. |
| 8,325,720 B2 | 12/2012 | Gao et al. |
| 8,386,593 B1 | 2/2013 | Gao et al. |
| 8,386,937 B1 | 2/2013 | Gao et al. |
| 8,805,982 B1 | 8/2014 | Wilsey et al. |
| 2006/0168184 A1 | 7/2006 | Rentschler |
| 2007/0208840 A1 | 9/2007 | McConville et al. |
| 2014/0280831 A1 | 9/2014 | Gao et al. |
| 2014/0280833 A1 | 9/2014 | Gao et al. |
| 2014/0282027 A1 | 9/2014 | Gao et al. |
| 2015/0156077 A1 | 6/2015 | Gao et al. |
| 2016/0112270 A1 | 4/2016 | Danait et al. |

OTHER PUBLICATIONS

International Search Report and Written Opinion issued in corresponding Application No. PCT/US2017/037473, dated Sep. 15, 2017 (11 pages).

*Primary Examiner* — David E Choi
(74) *Attorney, Agent, or Firm* — Chamberlain, Hrdlicka, White, Williams & Aughtry

(57) ABSTRACT

A method for visualizing a network. The method includes identifying, for each of a set of network elements, a network element role and a network element connectivity, grouping the network elements based on the network element roles, displaying at least a subset of the grouped network elements, and displaying connections between the displayed network elements, based on the network element connectivity.

19 Claims, 8 Drawing Sheets

METHOD AND SYSTEM FOR VISUALIZING NETWORKS

BACKGROUND

Information technology (IT) networks may include numerous interconnected computing devices, routers, switches and/or other network elements. A visual representation of these networked elements may be displayed to users such as network administrators.

SUMMARY

In general, in one aspect, the invention relates to a method for visualizing a network. The method includes identifying, for each of a set of network elements, a network element role and a network element connectivity, grouping the network elements based on the network element roles, displaying at least a subset of the grouped network elements and displaying connections between the displayed network elements, based on the network element connectivity.

In general, in one aspect, the invention relates to a system for visualizing a network. The system includes a network topology database that includes network element entries for network elements. The system further includes a network visualization engine that identifies, for each of a set of network elements in the network topology database, a network element role and a network element connectivity, and groups the network elements based on the network element roles. The system also includes a network visualization interface that displays at least a subset of the grouped network elements, and displays connections between the displayed network elements, based on the network element connectivity.

In general, in one aspect, the invention relates to a non-transitory computer readable medium including instructions that enable a system for visualizing a network to identify, for each of a set of network elements, a network element role and a network element connectivity, group the network elements based on the network element roles, display at least a subset of the grouped network elements and display connections between the displayed network elements, based on the network element connectivity.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for visualizing networks. An information technology (IT) network, in accordance with one or more embodiments of the invention, includes network elements such as routers and/or switches, and/or computing devices such as servers, desktop and portable end-user devices, etc. Network elements and/or computing devices, in accordance with an embodiment of the invention, are interconnected using wired and/or wireless network connections.

In one or more embodiments of the invention, a network visualization application is used to graphically visualize the network connectivity between network elements. A viewer of the visualization, e.g., a system administrator, may rely on the network visualization, displayed by the network visualization application, to monitor the network. The network visualization may be automatically or semi-automatically generated by the network visualization application, based on information available about the network. In one embodiment of the invention, the network visualization further visualizes additional characteristics of the displayed network. The additional visualized characteristics may include, but are not limited to, network traffic load and/or bottlenecks, erroneous connections, etc.

Figure 1:
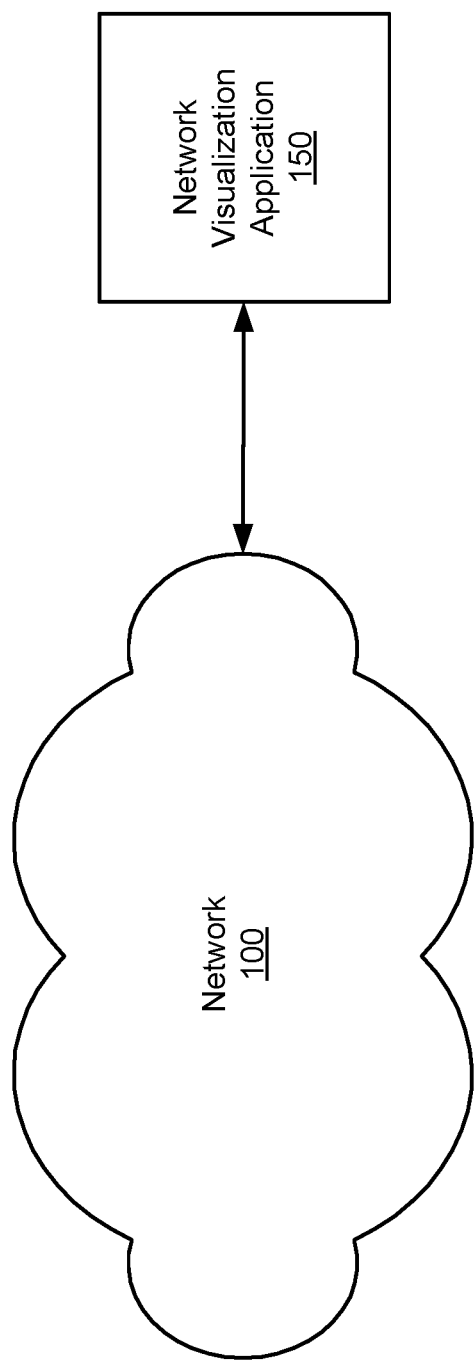
FIG. 1 shows a system, in accordance with one or more embodiments of the invention.

FIG. 1 shows a system for visualizing a network, in accordance with one or more embodiments of the invention. The system includes a network (100) and a network visualization application (150). These components are subsequently described.

The network (100), in accordance with one or more embodiments of the invention, may be any type of network that establishes connectivity between computing devices. The connectivity may be established by a combination of interconnected network elements such as routers and switches that form a network fabric. The network may be, for example, a Clos network. An exemplary network is described below, with reference to FIG. 2.

The network visualization application (150), in accordance with one or more embodiments of the invention, is a software application or a combination of software and hardware that generates a graphical representation of the network (100) or of parts of the network, from information obtained about the network (100). The graphical representation of the network may be suitable for exploring and/or monitoring the network. The network visualization application (150) may provide a visualization of the entire network or of parts of the network. The network visualization may be a static representation of the network (100) or a dynamic representation of the network (100) that updates as the network (100) is changing. In one embodiment of the invention, the visualization is interactive, thus, for example, enabling the user to visually explore details of interest while hiding non-relevant network information, by displaying warnings when deviations from a desired network design are detected, etc. Elements of the network visualization application (150) are further described below, with reference to FIG. 3.

Figure 2:
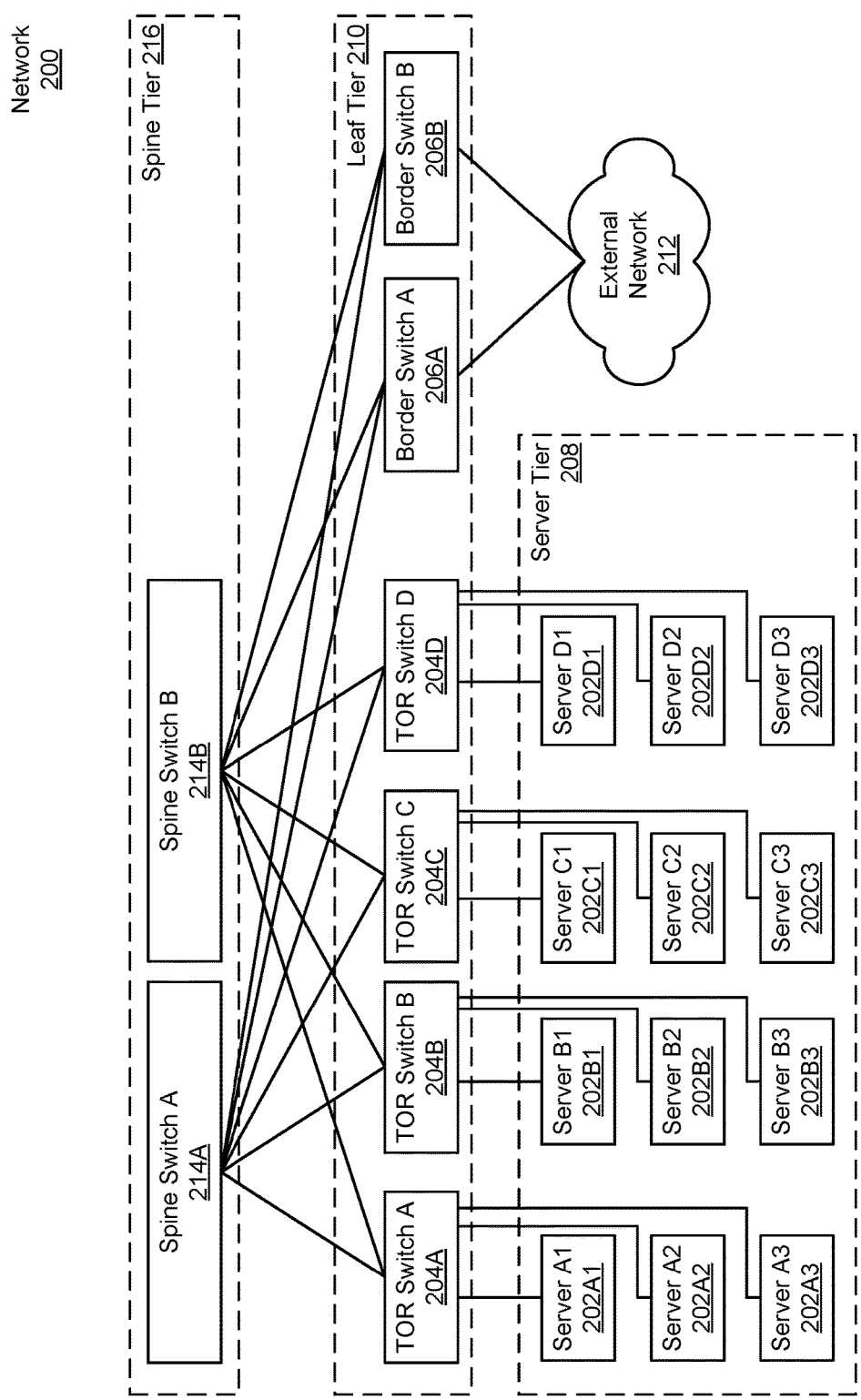
FIG. 2 shows an exemplary network, in accordance with one or more embodiments of the invention.

FIG. 2 shows an exemplary network, in accordance with one or more embodiments of the invention. The network (200) may be hierarchically organized. In the example of FIG. 2, the network is a Clos-type network that includes a server tier (208), a leaf tier (210) and a spine tier (216).

The server tier (208) may include computing devices, e.g., servers A1-D3 (202A1-202D3). Each server may include a processor, memory, and one or more physical network interfaces. Examples of types of servers include, but are not limited to, Dynamic Host Configuration Protocol (DHCP) servers, database servers, application servers, file servers, print servers, and mail servers. At least one network interface of a server connects the server to the network (200) via a top of rack (TOR) switch (204A-204D), located in the leaf tier (210).

In the exemplary network of FIG. 2, the leaf tier (210) further includes two border switches (206A and 206B). The border switches may establish interfaces to other external networks (212). Each of the border switches and each of the TOR switches (204A-204D) in the leaf tier (210) is connected to each of the spine switches (214A, 214B) in the spine tier (216).

The leaf and the spine tier (210, 216) in combination thus form the network fabric that enables the computing device in the network to communicate. More specifically, in one or more embodiments of the invention, the network elements, including the spine switches (214A and 214B), the TOR switches (204A-204D) and the border switches (206A and 206B) are configured to act in concert to provide a connection for the exchange of data packets between the servers (202A1-202D3) and/or between the servers and other devices in the external network (212). For example, data packets may be communicated between server A1 (202A1) and server C2 (202C2), via TOR switch A (204A), spine switch A and/or B (214A and/or 214B), and leaf switch C (204C). Because each TOR switch is connected to each spine switch, multiple redundant paths may exist for a computing device to communicate with another computing device. Bandwidth enhancing protocols such as equal-cost multipathing (ECMP) may be relied upon to exploit these redundancies in the connectivity.

One skilled in the art will recognize that the architecture of a network is not limited to the components shown in FIG. 2. For example, although the network elements in the exemplary network of FIG. 2 are layer 3 devices (e.g. routers or multi-layer switches), one skilled in the art will appreciate that one or more of these network elements may alternatively be layer 2 devices (e.g. switches). Further, a network in accordance with an embodiment of the invention may be of any size and complexity and may have any number of tiers. Further, even though the computing devices in the server tier (208) are described as servers, the computing devices may alternatively be other types of computing devices, including, but not limited to, workstations and portable devices. One skilled in the art will appreciate that a computing device may be any device capable of interfacing with the network. A computing device may be for example a device similar to the one described with reference to FIG. 6. One skilled in the art will further recognize that a network, in accordance with one or more embodiments of the invention, may be any type of communication network that may include physical and/or virtual, wired and/or wireless communication segments using any type of communication protocol and/or communication medium. A network may, for example, include Ethernet segments, wireless local area network (LAN) segments, virtual extensible LAN (VXLAN) segments, etc., without departing from the invention.

Figure 3:
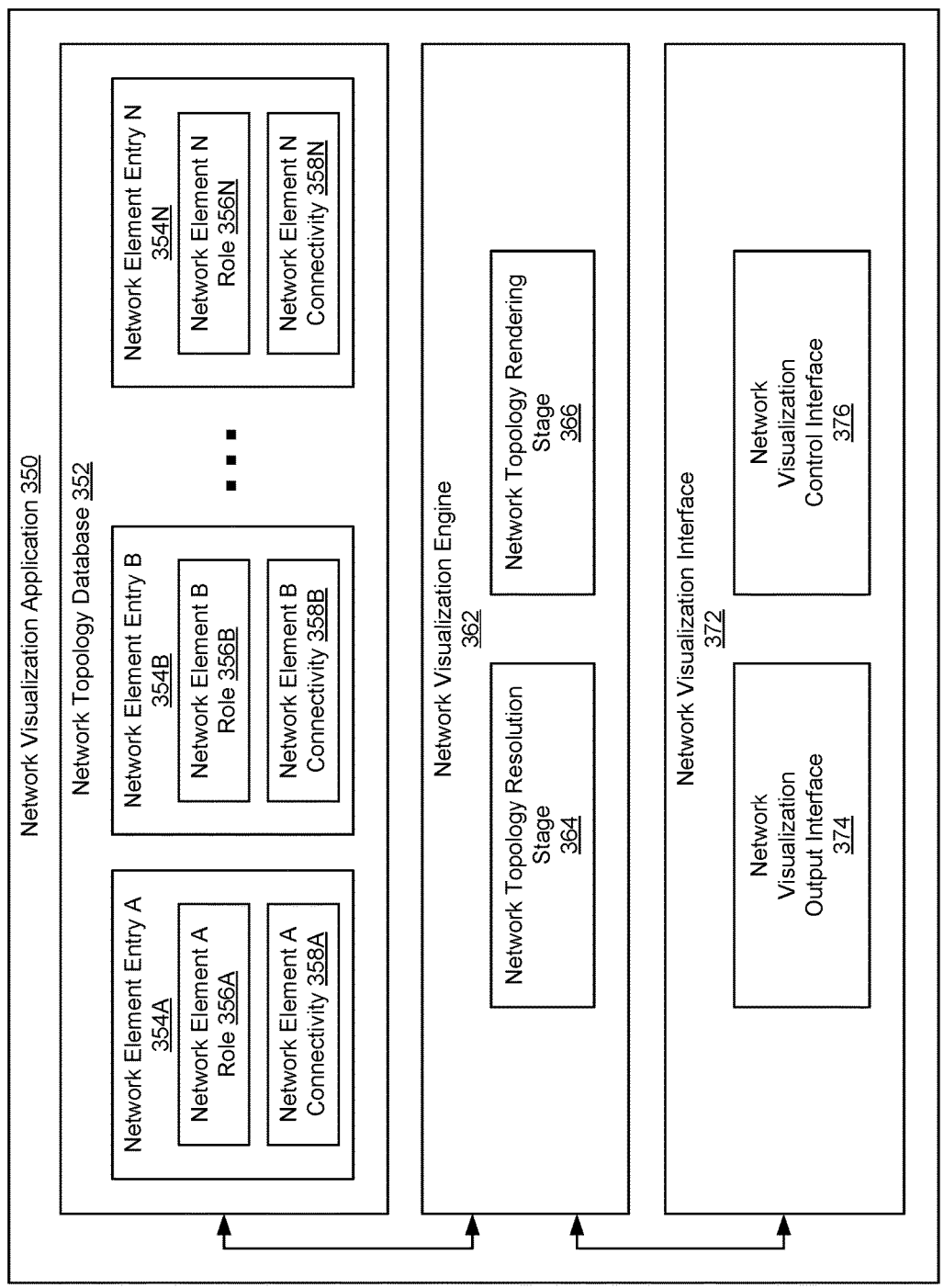
FIG. 3 shows a network visualization application, in accordance with one or more embodiments of the invention.

FIG. 3 shows a network visualization application (350), in accordance with one or more embodiments of the invention. The network visualization application (350), in accordance with one or more embodiments of the invention, includes instructions which, when executed on a computing device, generate a visualization of a network (e.g., of the exemplary network shown in FIG. 2). The network visualization application may be computer executable code, stored on a non-transitory computer readable medium, e.g., on a hard disk drive, flash memory, etc., of the computing device. The network visualization application may be executing on a computing device similar to the computing device described in FIG. 6. The network visualization application (350) includes a network topology database (352), a network visualization engine (362), and a network visualization interface (372). Each of these components is subsequently described.

The network topology database (352), in accordance with one or more embodiments of the invention, stores information about the network (200). The network topology database (352) may obtain information about network elements such as computing devices, routers, switches, etc. The obtained information may include, but is not limited to, a network element role (356A-356N) and a network element connectivity (358A-358N). Network element roles (356A-356N) and network element connectivity (358A-358N) may be organized per network element in separate network element entries (354A-354N).

A network element role (356), in accordance with an embodiment of the invention, specifies the role of the network element (354) in the network (200). Roles include, but are not limited to, "computing device", "leaf network element", and "spine network element".

The network element connectivity (358), in accordance with an embodiment of the invention, specifies other network elements to which the network element is connected. Assume, for example, that network element A (354A) is a leaf switch that is physically connected, e.g., via Ethernet ports, to other network elements, including all spine switches in the spine layer and to a number of computing devices. The network element connectivity (358A), in this case, may include entries for the spine switches and for the computing devices to which the leaf switch is connected. While the above described network element connectivity relates to physical connections between network elements, the network connectivity may also include entries for non-physical connections, without departing from the invention. For example, if a network element is a member of a virtual local area network (VLAN), the network element connectivity may document virtual connections to other network elements of the VLAN.

The network topology database (352) may further include, for some or for all of the network elements in the network topology database, other entries, such as a network element identifier such as a physical address (e.g., a media access control (MAC) address), an IP address, or other known characteristics of the network element. The combination of all entries in the network topology database (352), in accordance with an embodiment of the invention, documents the functional organization of the network, thus establishing the necessary content based on which a visualization may be generated by the network visualization application, as subsequently described with reference to FIG. 4.

The network topology database (352) may be either manually established, e.g., by a network administrator or it may be automatically generated. The network topology database (352) may be manually established by a network administrator that generates network element entries (354) for the network elements in the network. Consider the exemplary network of FIG. 2. The network administrator may manually generate network element entries for all network elements in the spine tier (216), in the leaf tier (210) and in the server tier (208). For each of the generated network element entries the network administrator may further specify the network element role (356) and/or the network element connectivity (358). For example, the network administrator may specify that the role of TOR switch A (204A) is "leaf switch", and that the connectivity of TOR switch A includes connections to spine switches A and B (214A, 214B), and to servers A1-A3 (202A1-202A3).

Automatic generation of the network topology database (352) may rely on a network monitoring agent (not shown), that monitors one or more network protocols in order to collect information about the network elements in the network. More specifically, the Link Layer Discovery Protocol (LLDP) may be used by network elements in the network (200) to advertise their identities and/or capabilities. In one embodiment of the invention, the LLDP information is captured by the network monitoring agent and transmitted to the network visualization application (350), which subsequently stores the LLDP information in the network topology database (352). The LLDP information may be used, for example, to identify the network elements in the network and to generate the corresponding network element entries (354A) in the network topology database (352), and/or to determine the connectivity (358) of the network elements (354). Those skilled in the art will recognize that the invention is not limited to LLDP. The network topology database may be populated with network element information using other mechanisms including proprietary protocols, by analyzing traffic patterns during the operation of the network, by obtaining entries of the routing and/or forwarding tables of network elements, etc. More specifically, traffic patterns may be analyzed to heuristically determine the roles (356) of network elements (354).

Those skilled in the art will appreciate that a network topology database is not necessarily generated strictly manually or strictly automatically. For example, a network topology database may initially be established by a network monitoring agent, without input by the system administrator. The system administrator may then manually add content to the network topology database. For example, the system administrator may complete network element role information where not automatically determined by the network monitoring agent. The system administrator may also add additional roles, in cases where network elements may perform multiple roles such as in networks that include physical and virtual segments. A single network device depending on whether the physical or virtual segment is considered may have different roles and connectivity.

The network topology database (352) may be implemented as a structured or non-structured list of data available about network elements that were obtained either manually, e.g. by the network administrator, or automatically by a network monitoring agent. Alternatively, the network topology database (352) may be a spreadsheet or any other type of data representation suitable for capturing information about network elements. Accordingly, the organization of the network topology database (352) may deviate from the network topology database shown in FIG. 3, without departing from the invention.

The network topology database (352) may be located in volatile or non-volatile memory of a computing device. The network topology database (352) may be maintained in real-time, e.g., it may be updated as soon as new information about network elements becomes available. Alternatively, the network topology database (352) may be updated periodically, e.g. at set time intervals, or it may be static.

Continuing with the discussion of the network visualization application (350), the network visualization engine (362), in accordance with one or more embodiments of the invention, obtains network topology data of the network (200) from the network topology database (352) and derives a visualization of the network (200) from the network topology data.

The network visualization engine (362), in accordance with an embodiment of the invention, includes a network topology resolution stage (364) and a network topology rendering stage (366).

The network topology resolution stage (364) in accordance with an embodiment of the invention, receives network topology data from the network topology database (352) and resolves, based the network element roles (356) and the network element connectivity (358) of the network elements (354), the functional organization of the network elements to be rendered. The network topology resolution engine may group network elements in logical groups, based on their roles, such that, for example, all spine network elements are grouped in a spine tier logical group, all leaf network elements are grouped in a leaf tier logical group, etc. Further, the connections between the network elements may be resolved from the network element connectivity entries in the network topology database (352). The network topology resolution stage (364) thus compiles disjoint network topology database (352) entries to generate a representation that reflects the functional organization of the network. A description of the steps performed by the network topology resolution stage, in accordance with one or more embodiments of the invention, is provided below, with reference to FIG. 2.

The network topology rendering stage (366), in accordance with an embodiment of the invention, uses the network representation compiled by the network topology resolution stage (364), and generates a visualization under consideration of visualization rules. Visualization rules may define, for example, what network elements are to be displayed versus what network elements are not to be displayed, how to make use of the available network visualization output interface space, etc. A detailed description of the steps performed by the network topology rendering stage (366), in accordance with one or more embodiments of the invention, is provided below with reference to FIG. 2.

Continuing with the discussion of the network visualization application (350), the network visualization interface (372) in accordance with an embodiment of the invention, is a user interface that provides visualization output to the user via the network visualization output interface (374), and that obtains user input via the network visualization control interface (376).

The network visualization output interface (374) may be a window or an entire screen, available for the displaying of the rendered network visualization, generated by the network topology rendering stage (366). The network visualization output interface (374) may display, for example, network visualizations such as the exemplary network visualizations shown in FIGS. 5A-5C. These visualization are generated as described in FIG. 4, in accordance with one or more embodiments of the invention. The network visualization output interface (374) may symbolically represent network elements and connections between the network elements. Further, overlays may be used to provide additional content such as labels and color coding. In one embodiment of the invention, the network visualization output interface (374) is interactive. The user viewing the network visualization output interface (374) may, for example, navigate the visualized network and/or may interact with elements of the visualized network, as described in FIG. 4.

The network visualization control interface (376), in accordance with an embodiment of the invention, is a user interface that enables a user to control the network visualization application (350). More specifically, the network visualization control interface may enable the user to control operations performed by the network topology rendering stage (368), as described in FIG. 4, thus affecting the rendered visualization, displayed by the network visualization output interface (374). The network visualization control interface (376) may include GUI widgets (e.g., radio buttons, drop-down lists, textboxes, etc.). In one embodiment of the invention, the network visualization output interface (374) and the network visualization control interface (376) form one combined user interface.

One skilled in the art will recognize that neither the architecture of the network (200) nor the architecture of the network visualization application (350) is limited to the components shown in FIGS. 1-3. For example, the network (100, 200) may be any type of data transmitting network of any size, complexity and architecture that may include any number and types of network elements. Also, even though in FIG. 1, the network visualization application (150) is shown as a component external to the network (100), those skilled in the art will appreciate that the network visualization application may be hosted on a computing device that is part of the network (100). Further, the arrangement of the components of the network visualization application (350) may deviate from the arrangement shown in FIG. 3, without departing from the invention. Certain components may be distributed across the network. For example, the network topology database (352) may be hosted elsewhere, e.g., on a dedicated or shared server or on a network element of the network (100), rather than being an element of the network visualization application (350). A network element may, for example, execute a software agent that maintains the network topology database on the network element itself.

Figure 4:
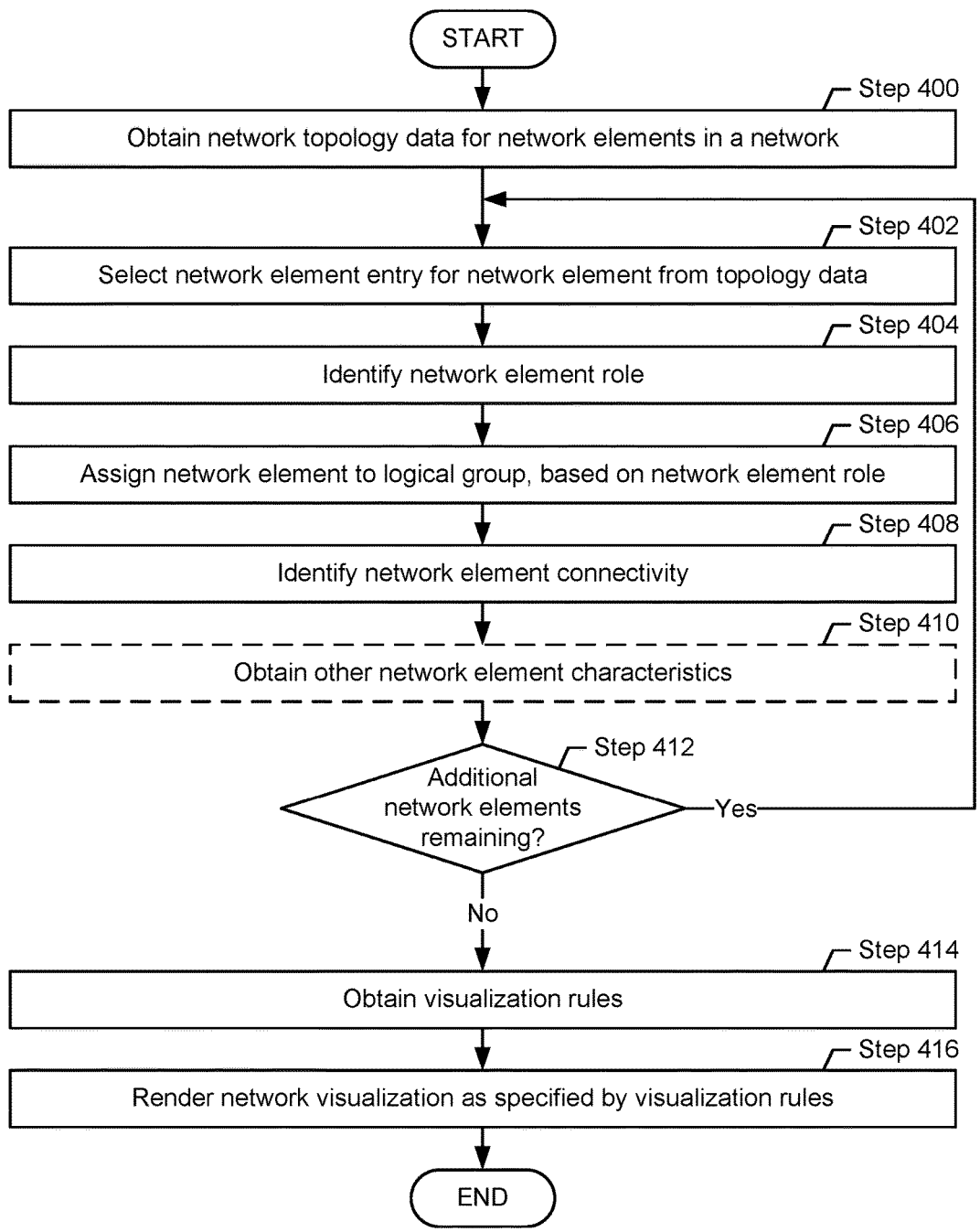
FIG. 4 shows a flowchart in accordance with one or more embodiments of the invention.

FIG. 4 shows a flowchart in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIG. 4 may be performed in parallel with any other steps shown in FIG. 4 without departing from the invention.

FIG. 4 shows a method for visualizing networks, in accordance with one or more embodiments of the invention. The method may be executed once to visualize a particular network state. Alternatively, the method may be executed repeatedly to visualize a network state as it evolves over time. The visualization may be driven by real-time network topology data or by historical network topology data that was archived. While the method described below is for a visualization of a physical network with physical connections between physical network elements, those skilled in the art will appreciate that the method is equally applicable to non-physical networks. For example, the same method may be applied to visualize one or more virtual local area networks (VLANs), to visualize logical interfaces such as port channels, and/or to visualize combinations of physical and virtual network elements.

In Step 400, network topology data are obtained. In one embodiment of the invention, the network topology data are obtained from a network topology database. Network topology data may be obtained as a result of a user of the network visualization application requesting the data, e.g., by executing the network visualization application, and/or they may be obtained automatically, as scheduled, e.g., periodically, or event-triggered. For example, the network topology database may be dynamically updated when a change in the network topology is found, and as a result the network topology database may issue a notification that new network topology data are available. Network topology data may be either pushed by the network topology database once new data become available, or the network visualization may poll the network topology database to pull data from the database. Further, network topology data may also be streamed, either from a real-time or historical data source.

In one embodiment of the invention, the obtained network topology data include information about a set of network elements of the network to be visualized, such as the connectivity between at least some of these network elements. The obtained network topology data may include, for example, network element entries for computing devices, routers, switches and/or multi-layer switches. Each network element entry may include a network element role and a network element connectivity, as previously described. The obtained network topology data may further include additional information about the network elements, in addition to the connectivity and role information. The additional information may include, for example, network element identifiers such as hardware IDs including media access control (MAC) addresses, serial numbers, labels and or descriptive information assigned by the administrator, associated Internet protocol (IP) addresses, etc.

In the subsequent Steps 402-412, network element information is extracted from the data obtained in Step 400, and/or additional data may be obtained from elsewhere. These steps may produce the information used to generate a visualization of the network elements.

In Step 402, a network element entry for a network element is selected from the network element entries obtained in Step 400, and in Step 404, the role of the selected network element is identified. The identification of the role may be performed by extracting the role of the network element from the network topology data obtained in Step 400.

In Step 406, the network element is assigned to a logical group based on the network element role identified in Step 404. Logical groups, in accordance with an embodiment of the invention, are formed based on a relationship between network elements. Physical connections, logical connections, and/or functional relationships may be considered when forming logical groups. For example, in the exemplary network of FIG. 2, one logical group may be formed for all spine network devices, one logical group may be formed for all TOR switches, separate logical groups may be formed for servers A1-A3, for servers B1-B3, for servers C1-C3 and for servers D1-D3, respectively. The network elements in each group have in common that they perform similar functions and that they have similar connectivity. For example, all spine switches connect to all TOR switches. Alternative logical groupings are possible. For example, the TOR switches and the border switches may be organized in a single logical group rather than being organized in separate logical groups. Those skilled in the art will recognize that what constitutes a logical group may be configurable and is not limited to the above example. For example, a logical group may be based on virtual rather than physical connections between network devices, e.g., in the example of a VLAN. In a virtual extensible local area network (VXLAN), a logical group may be formed by the network elements belonging to a layer-2 domain or domains identified by one or more virtual network identifiers (VNIs). Another possible grouping may be based on layer-3 information obtained from the routing protocol being used. For example, network elements that rely on der border gateway protocol (BGP) may be joined in a logical group if they are aware of or if they are part of a particular autonomous system (AS). Additionally or alternatively, a logical grouping may be obtained based on input provided by a network administrator. Consider, for example, a scenario in which he network administrator specifies selected network elements. The network elements may be specified using their media access control (MAC) addresses, host names, IP address, and/or serial numbers, etc. A logical group may then include all network elements that connect those selected network elements. The connecting network elements may be determined, for example, by examining MAC tables, address resolution protocol (ARP) tables, and/or forwarding information base (FIB) content, etc., which may allow the determination of possible paths that traffic could take between the selected network elements. All network elements that may be on at least one of these paths may be included in the logical group.

In Step 408, the connectivity of the selected network element is identified. Identification of the network element connectivity may include analyzing the network topology data obtained in Step 400 for connectivity information related to the selected network element. For example, the network topology data obtained in Step 400 may indicate, that network element A is connected to network element B via port 1 of network element A. In addition, the network topology data may also indicate that network element B is connected to the network element A via port 5 of network element B. Based on these two pieces of information, it may be determined that the interface between the first and the second network element includes port 1 of the first network element and port 5 of the second network element.

In Step 410, other network element characteristics may be obtained, e.g., in cases where additional characteristics are to be visualized. This visualization may enable a network administrator to quickly assess the state of a network element (e.g., whether there are alerts, failures, etc.). Network element characteristics to be visualized may include, but are not limited to, network element IDs, network element configuration details, network element performance data (such as, for example, dropped packet counts, error counts, latency measurements and/or temperature measurements), network element protocol data (e.g., whether links are disabled in a spanning tree protocol), and/or other network element role information (such as, e.g., whether the network element is a member of a virtual local area network (VLAN)). These additional characteristics may be obtained from the network topology database and/or from other data sources such as network monitoring agents.

In Step 412, a determination is made about whether additional networking elements that are to be visualized are remaining. If additional network elements are remaining, the method may return to Step 402 to repeat the previously described steps for another selected network element. If no additional network elements are remaining, the method may proceed to Step 414.

In Step 414, visualization rules are obtained. Generally, visualization rules, in accordance with one or more embodiments of the invention, specify how a visualization of the network elements of the network is to be performed. Visualization rules may, for example, specify whether each network element in a group of network elements is shown, or whether the group is instead collapsed and represented by a single collapsed group element, e.g., a group symbol. Visualization rules may be specified by users e.g. via the network visualization control interface, and/or they may be pre-implemented in the network visualization application.

Subsequently, a set of exemplary visualization rules are described. Those skilled in the art will appreciate that network visualization methods, in accordance with one or more embodiments of the invention, may implement other visualization rules, without departing from the invention.

Visualization of Anomalies:

An anomaly in the network, in accordance with an embodiment of the invention, is highlighted by displaying the logical group with the anomaly, while concealing other network elements without anomalies in collapsed logical groups. Anomalies may be, for example, connectivity errors (e.g. a leaf network element that is not fully connected to all spine network elements, a leaf network element that is directly connected to another leaf network element, or a link aggregation group where one or more of the physical links is down), and other aberrations such as low memory, high temperature, excessive network element communication latencies or bandwidth bottlenecks between network elements, etc. In order to detect an anomaly, the actual state of the network may be compared to a target state. A target state may be provided in the form of reference network data. These reference network data may be a complete or a partial reference network architecture, sets of rules that specify allowable and/or prohibited configurations, ranges of operating parameters, etc., that may have been provided by a network administrator.

Visualization of Virtual Networks:

A virtual local area network (VLAN), in accordance with an embodiment of the invention, is highlighted by displaying the network elements associated with the VLAN, while collapsing logical groups without VLAN network elements. Group details may be shown, for example, for those groups that include the virtual tunnel endpoints (VTEPs) of the VLAN and for any other groups that include network elements associated with the VLAN.

Visualization of Port Channels:

A port channel (e.g., a link aggregation group (LAG)), in accordance with an embodiment of the invention, is shown as a single link, i.e., the underlying physical links, in the visualization, are collapsed into a single link. Port channels may be detected, for example, by inspecting routing tables of layer 3 network elements. Layer 3 information may have been obtained in Step 410.

Visualization of Performance:

In one embodiment of the invention, a performance-indicating overlay may be superimposed on the network visualization. One or more network monitoring agents may monitor various performance indicators such as data throughput and latencies. Such performance measurements may be used, for example, to color-code the network visualization. If typical or threshold performance values are known, the overlay may further be used to indicate when these performance values are violated, thus, for example, indicating bottlenecks.

User-Defined or Default Visualization:

In one embodiment of the invention, the user of the network visualization application may select and customize one or more of the above visualization rules and/or may define different visualization rules. A user may, for example, decide to collapse or uncollapse the visualization of a LAG or a VLAN. Further, the user may make particular selections of details that should be visualized. For example, the user may select two particular network elements and may request the visualization of all possible paths between these network elements. In one embodiment of the invention, a user may phrase such requests using natural language queries. A user may, for example, make the request: "show the ten busiest links" to obtain a network visualization where the ten connections with the highest data throughput are highlighted. Further, default visualization rules may apply. These default visualization rules may specify the degree of detail to be shown by default. For example, the number of network elements to be shown in the network visualization output interface is limited to avoid a cluttered visualization. Accordingly, one or more logical groups of network elements may be collapsed. Similarly a rule may specify that only a limited number of nested logical groups is shown. Default visualization rules may include other constraints, without departing from the invention. Further, the default visualization rules may be adaptive, for example based on available network visualization output interface space. A larger space may allow a larger number of network elements to be visualized, whereas a smaller space may limit the number of network elements to be visualized. Similarly, the network visualization rules may adjust based on the user experience level. While an expert user may receive a detailed visualization in which more details are shown, a less experienced user may only receive a visualization where limited details are shown, for example, by collapsing logical groups. In either case, the user may manually collapse or uncollapse logical groups in order to adjust to the desired level of details.

In Step 416, the network visualization is rendered to be displayed in the network visualization output interface. The rendering may be performed based on the visualization rules obtained in Step 414. The rendering may be updated whenever newly received network topology data and/or updated visualization rules (resulting, e.g., from user input) result in a change in the network visualization.

Figure 5A:
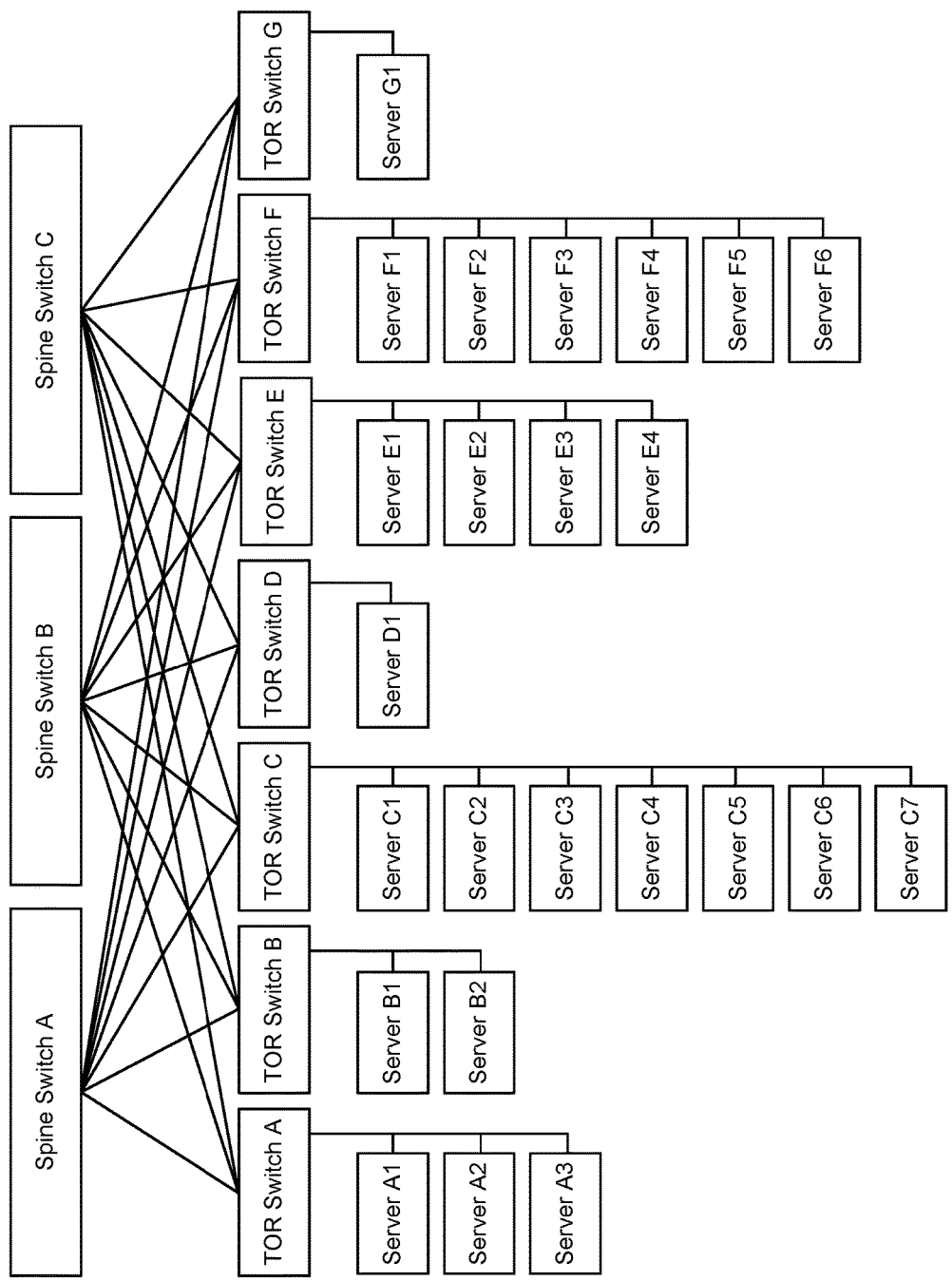
FIGS. 5A-5C show network visualizations in accordance with one or more embodiments of the invention.
Figure 5B:
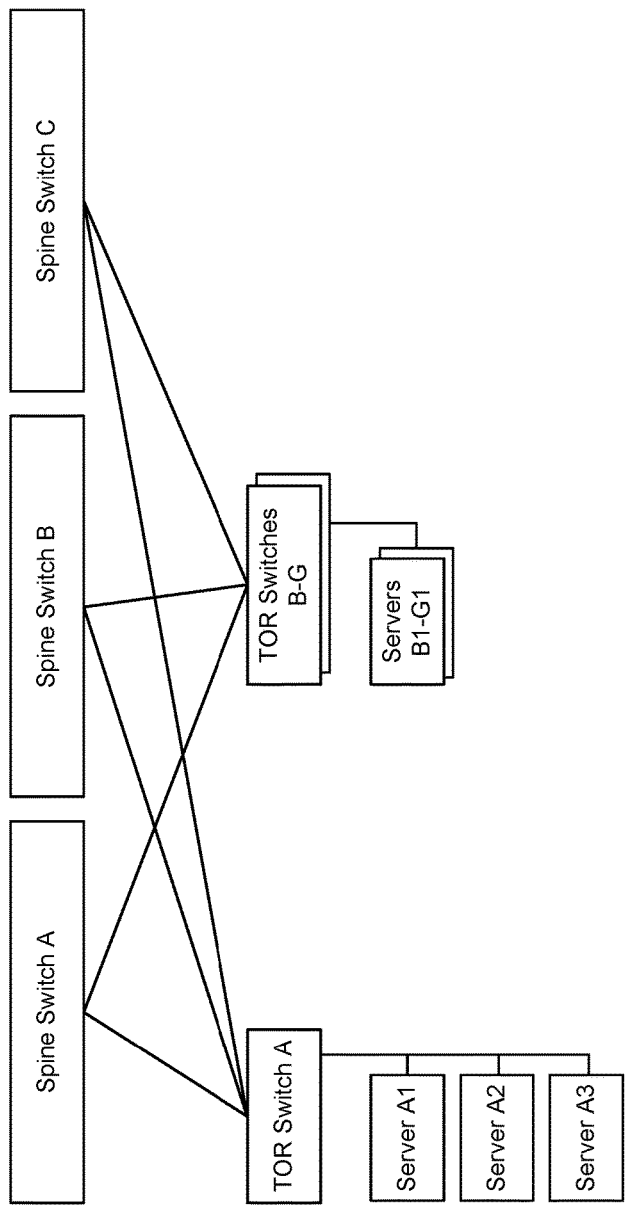
Figure 5C:
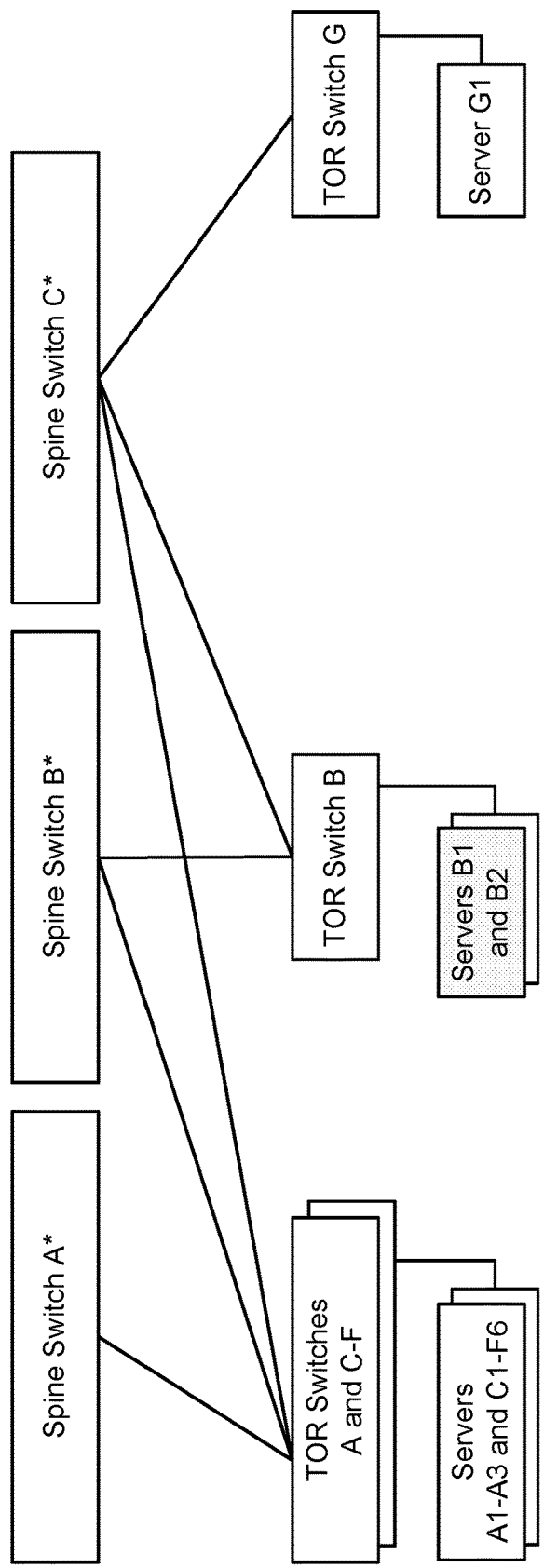
Figure 6:
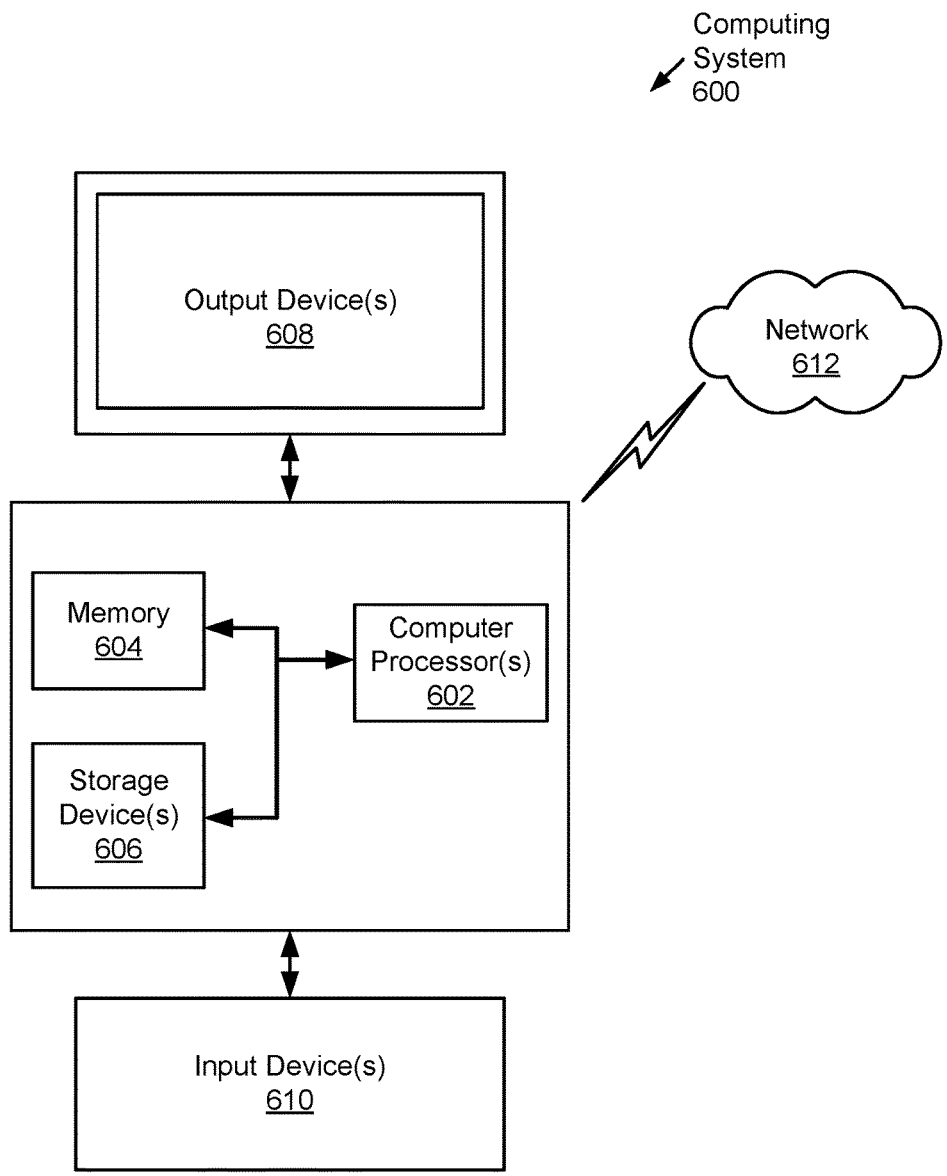
FIG. 6 shows a computing system in accordance with one or more embodiments of the technology.

FIGS. 5A-5C show examples, in accordance with one or more embodiments of the invention. A use case scenario, based on these examples, is intended to provide an illustration of the method for visualizing networks, described in FIG. 4. The use case scenario is for illustrative purposes only and the method described by FIG. 4 are not limited to the visualization example, but rather are universally applicable to a wide range of networks of different structure, complexity and size.

Consider the datacenter network visualized in FIG. 5A. Multiple groups of servers (Servers A1-G1) are connected to a network via top of rack (TOR) switches A-G. The TOR switches in combination with spine switches A-C form a Clos network fabric with a fully meshed topology. FIG. 5A is a visualization of the datacenter network where all network elements are displayed, e.g., upon user request.

FIG. 5B shows the same data center network in a visualization where multiple groups of network element have been collapsed. Only the spine switches A-C, TOR switch A and servers A1-A3 are displayed. The collapsing of all other details was performed upon user request.

FIG. 5C shows the data center network after a hardware upgrade. Spine switches A-C have been replaced by spine switches A*-C*. However, during the upgrade, not all connectivity was properly re-established, by mistake. Specifically, TOR switch B is not properly connected to spine switch A*, and TOR switch G lacks connections to spine switches A* and B*. The datacenter network, in this configuration, may operate with reduced performance, despite the incomplete wiring. The network visualization application detects this anomaly and highlights the faulty wiring. While TOR switches A and C-F, servers A1-A3 and C1-F5 and B1 and B2 are collapsed into symbolic group representations, TOR switches B and G are shown without collapsing, in order to point out the erroneous connectivity, as illustrated in FIG. 5C.

Embodiments of the invention enable the visualization of networks and network elements of the network. Complex and large networks that may otherwise be difficult to comprehend may be visualized. The visualization may be established from network element data in a network topology database, without requiring user assistance. Elements of the visualization, such as groups of network elements, may be collapsible and extendable thus enabling a user to navigate the network at the desired level of detail. The network visualization may thus be particularly beneficial when dense network fabrics with a high number of redundant connections are to be visualized, such as in Clos networks. In one or more embodiments of the invention, the network visualization application is configured to highlight detected anomalies in the network. The network visualization application may thus also be used for debugging, failure analysis, and as a forensic tool, when driven by historical network data.

Various components of one or more embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for visualizing an information technology (IT) network, the method comprising:
   identifying, for each of a plurality of network elements in the IT network, a network element role and a network element connectivity;
   grouping the plurality of network elements based on the network element roles, to obtain a plurality of logical groups;
   obtaining visualization rules for visualizing the IT network;
   displaying a connectivity graph comprising:
      a set of nodes representing the plurality of network elements;
      a set of edges interconnecting the set of nodes, wherein the set of edges represents connections between the plurality of network elements based on the network element connectivity; and
      an overlay superimposed on a subset of the set of nodes, a subset of the set of edges, or combination thereof, based on the visualization rules,
      wherein another subset of the set of nodes, representing a logical group of the plurality of logical groups, is concealed in a collapsed group element.

2. The method of claim 1, wherein the network element role is a computing device, a leaf network element, or a spine network element.

3. The method of claim 1, wherein the network element role of a network element is obtained from an analysis of network communications of the network element with other network elements.

4. The method of claim 1, wherein the network element connectivity of a network element is obtained from link layer discovery protocol (LLDP) communications of the network element.

5. The method of claim 1,
   wherein the overlay encodes an anomaly in the IT network,
   wherein the plurality of logical groups, excluding the logical group concealed in the collapsed group element, comprises network elements with the anomaly,
   wherein the logical group concealed in the collapsed group element comprises network elements without the anomaly.

6. The method of claim 1,
   wherein the overlay encodes a virtual local area network (VLAN) in the IT network,
   wherein the plurality of logical groups, excluding the logical group concealed in the collapsed group element, comprises network elements associated with the VLAN,
   wherein the logical group concealed in the collapsed group element comprises network elements not associated with the VLAN.

7. The method of claim 1,
   wherein the overlay encodes traffic loads on the subset of the set of edges or latencies associated with the subset of the set of edges.

8. A system for visualizing an information technology (IT) network, the system comprising:
   a network topology database comprising network element entries for a plurality of network elements in the IT network;
   a network visualization engine that:
      identifies, for each of the plurality of network elements in the network topology database, a network element role and a network element connectivity;
      groups the plurality of network elements based on the network element roles, to obtain a plurality of logical groups;
      obtains visualization rules for visualizing the IT network; and
   a network visualization interface that:
      displays a connectivity graph comprising:
         a set of nodes representing the plurality of network elements;
         a set of edges interconnecting the set of nodes, wherein the set of edges represents connections between the plurality of network elements based on the network element connectivity; and
         an overlay superimposed on a subset of the set of nodes, a subset of the set of edges, or combination thereof, based on the visualization rules,
         wherein another subset of the set of nodes, representing a logical group of the plurality of logical groups, is concealed in a collapsed group element.

9. The system of claim 8, wherein the network element role of a network element is obtained from an analysis of network communications of the network element with other network elements.

10. The system of claim 8, wherein the network element connectivity of a network element is obtained from link layer discovery protocol (LLDP) communications of the network element.

11. The system of claim 8,
wherein the overlay encodes an anomaly in the IT network,
wherein the plurality of logical groups, excluding the logical group concealed in the collapsed group element, comprises network elements with the anomaly,
wherein the logical group concealed in the collapsed group element comprises network elements without the anomaly.

12. The system of claim 8,
wherein the overlay encodes a virtual local area network (VLAN) in the IT network,
wherein the plurality of logical groups, excluding the logical group concealed in the collapsed group element, comprises network elements associated with the VLAN,
wherein the logical group concealed in the collapsed group element comprises network elements not associated with the VLAN.

13. A non-transitory computer readable medium (CRM) comprising instructions that enable a system for visualizing an information technology (IT) network to:
identify, for each of a plurality of network elements in the IT network, a network element role and a network element connectivity;
group the plurality of network elements based on the network element roles, to obtain a plurality of logical groups;
obtain visualization rules for visualizing the IT network;
display a connectivity graph comprising:
a set of nodes representing the plurality of network elements;
a set of edges interconnecting the set of nodes, wherein the set of edges represents connections between the plurality of network elements based on the network element connectivity; and
an overlay superimposed on a subset of the set of nodes, a subset of the set of edges, or combination thereof, based on the visualization rules,
wherein another subset of the set of nodes, representing a logical group of the plurality of logical groups, is concealed in a collapsed group element.

14. The non-transitory CRM of claim 13, wherein the network element role of a network element is obtained from an analysis of network communications of the network element with other network elements.

15. The non-transitory CRM of claim 13, wherein the network element connectivity of a network element is obtained from link layer discovery protocol (LLDP) communications of the network element.

16. The non-transitory CRM of claim 13,
wherein the overlay encodes an anomaly in the IT network,
wherein the plurality of logical groups, excluding the logical group concealed in the collapsed group element, comprises network elements with the anomaly,
wherein the logical group concealed in the collapsed group element comprises network elements without the anomaly.

17. The non-transitory CRM of claim 13,
wherein the overlay encodes a virtual local area network (VLAN) in the IT network,
wherein the plurality of logical groups, excluding the logical group concealed in the collapsed group element, comprises network elements associated with the VLAN,
wherein the logical group concealed in the collapsed group element comprises network elements not associated with the VLAN.

18. The system of claim 8,
wherein the overlay encodes traffic loads on the subset of the set of edges or latencies associated with the subset of the set of edges.

19. The non-transitory CRM of claim 13,
wherein the overlay encodes traffic loads on the subset of the set of edges or latencies associated with the subset of the set of edges.

* * * * *